United States Patent
Bigelow

(10) Patent No.: US 9,327,848 B2
(45) Date of Patent: May 3, 2016

(54) METHOD OF DEPLOYING A SPACECRAFT SHIELD IN SPACE

(75) Inventor: Robert T. Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 0 days.

(21) Appl. No.: 13/507,179

(22) Filed: Jun. 11, 2012

(65) Prior Publication Data

US 2013/0327894 A1    Dec. 12, 2013

(51) Int. Cl.
*B64G 1/56* (2006.01)
*B82Y 30/00* (2011.01)

(52) U.S. Cl.
CPC .. *B64G 1/56* (2013.01); *B82Y 30/00* (2013.01)

(58) Field of Classification Search
CPC .......... B64G 1/54; B64G 1/543; B64G 1/546; B64G 1/56; B64G 1/58
See application file for complete search history.

(56) References Cited

U.S. PATENT DOCUMENTS

| | | | | |
|---|---|---|---|---|
| 3,534,926 A * | 10/1970 | Wuenscher | ................ | 244/158.1 |
| 3,647,924 A * | 3/1972 | Rasquin | ................... | F27D 11/02 373/112 |
| 4,151,800 A * | 5/1979 | Dotts | ....................... | B64G 1/58 244/121 |
| 4,439,968 A * | 4/1984 | Dunn | ....................... | B64G 1/58 244/159.1 |
| 4,713,275 A * | 12/1987 | Riccitiello | ............... | B64G 1/50 244/117 A |
| 4,804,571 A * | 2/1989 | Jouffreau | ................ | F16L 59/12 244/117 A |
| 4,825,599 A * | 5/1989 | Swann, Jr. | ..................... | 52/2.15 |
| 5,236,151 A * | 8/1993 | Hagle | ....................... | B64C 1/38 244/117 A |
| 5,417,530 A * | 5/1995 | Grossner | .................. | B64G 1/58 411/258 |
| 5,511,747 A * | 4/1996 | Parrot | ...................... | B64G 1/58 244/159.1 |
| 5,601,258 A * | 2/1997 | McClymonds | ............ | 244/171.7 |
| 6,293,496 B1 * | 9/2001 | Moe | ........................ | B64G 1/58 244/119 |
| 6,298,765 B1 * | 10/2001 | Dvorak | ..................... | B64G 1/56 89/36.02 |
| 7,204,460 B2 * | 4/2007 | Bigelow | ..................... | 244/171.1 |
| 7,309,049 B2 * | 12/2007 | Bigelow | ..................... | 244/171.7 |
| 7,374,134 B2 * | 5/2008 | Collyer et al. | ............. | 244/172.4 |
| 7,377,469 B2 * | 5/2008 | Cherian | .................... | B64G 1/58 244/159.1 |
| 7,807,097 B1 * | 10/2010 | Tucker | ...................... | C22C 1/08 164/79 |
| 7,988,096 B2 * | 8/2011 | Humphries | .......... | B64G 1/1078 244/158.1 |
| 8,147,943 B1 * | 4/2012 | Byrd | ........................ | B64G 1/58 244/121 |
| 8,882,048 B2 * | 11/2014 | Levin et al. | ................ | 244/172.5 |
| 2002/0090331 A1 * | 7/2002 | Smalley | ................. | B01J 19/081 423/447.3 |
| 2002/0195030 A1 * | 12/2002 | Christiansen | ............ | E06B 9/00 109/49.5 |
| 2003/0131982 A1 * | 7/2003 | Riedell | .................... | B64G 1/58 165/185 |

(Continued)

OTHER PUBLICATIONS

T. Mieno; Characteristics of the gravity-free gas-arc discharge and its application to fullerene production; Nov. 26, 2003; IOP Publishing Ltd; pp. 211-219.*

(Continued)

*Primary Examiner* — Tien Dinh
*Assistant Examiner* — Michael A Fabula
(74) *Attorney, Agent, or Firm* — Franklin E. Gibbs

(57) ABSTRACT

A shield comprised of carbon nanotube materials is used to provide a level of protection to a spacecraft. Shield segments are produced in a facility in space. The segments are transported from the facility to a vicinity of a spacecraft hull. The segments are assembled over the hull to substantially cover an area of the hull.

1 Claim, 8 Drawing Sheets

(56) References Cited

U.S. PATENT DOCUMENTS

| | | | | |
|---|---|---|---|---|
| 2003/0164427 | A1* | 9/2003 | Glatkowski et al. | 244/158 R |
| 2003/0185741 | A1* | 10/2003 | Matyjaszewski et al. | 423/445 R |
| 2005/0230560 | A1* | 10/2005 | Glatkowski et al. | 244/171.7 |
| 2005/0284986 | A1* | 12/2005 | Bigelow | 244/171.7 |
| 2007/0063104 | A1* | 3/2007 | Humphries | 244/158.1 |
| 2007/0069082 | A1* | 3/2007 | Bigelow | 244/171.7 |
| 2008/0224100 | A1* | 9/2008 | Smalley et al. | 252/510 |
| 2009/0004094 | A1* | 1/2009 | Smalley et al. | 423/447.1 |
| 2009/0140098 | A1* | 6/2009 | Lengsfeld et al. | 244/121 |
| 2009/0169463 | A1* | 7/2009 | Smalley et al. | 423/445 B |
| 2009/0277897 | A1* | 11/2009 | Lashmore et al. | 219/544 |
| 2009/0308022 | A1* | 12/2009 | Kiskiras | B64C 1/40 52/794.1 |
| 2010/0009165 | A1* | 1/2010 | Patel et al. | 428/323 |
| 2010/0028074 | A1* | 2/2010 | Etling | F16B 5/065 403/24 |
| 2010/0178457 | A1* | 7/2010 | Pinney | B64G 1/58 428/137 |
| 2010/0219383 | A1* | 9/2010 | Eklund | 252/516 |
| 2011/0086781 | A1* | 4/2011 | Smalley et al. | 506/32 |
| 2011/0133031 | A1* | 6/2011 | Shah et al. | 244/119 |
| 2012/0138749 | A1* | 6/2012 | Ellinghaus | 244/168 |
| 2012/0160966 | A1* | 6/2012 | Shah et al. | 244/171.7 |
| 2012/0292449 | A1* | 11/2012 | Levin | B64G 1/00 244/158.2 |

OTHER PUBLICATIONS

Ho et al.; Extraterrestrial Fiberglass Production Using Solar Energy; Jan. 1, 1979; NASA; Space Resources and Space Settlements; pp. 225-232.*

Brown; Spacewalking astronauts attach micrometeoroid shields to ISS; Aug. 21, 2012; Wired UK; <http://www.wired.co.uk/news/archive/2012-08/21/iss-shields>.*

Dorneanu; Shields Up!-ISS Now Has Space Shields; May 31, 2007; <http://archive.news.softpedia.com/news/Shields-Up-ISS-Now-Has-Space-Shields-56112.shtml>.*

Orbital Debris Shielding; NASA; Aug. 25, 2009; <http://orbitaldebris.jsc.nasa.gov/protect/shielding.html>.*

Micrometeoroid and Orbital Debris (MMOD) Protection; NASA; Oct. 29, 2009; <http://www.nasa.gov/externalflash/ISSRG/pdfs/mmod.pdf>.*

Ingham; First 3D Printer in Space to Mark Start of Extraterrestrial Manufacturing; Sep. 3, 2014; Factor; <http://factor-tech.com/space/7639-first-3d-printer-in-space-to-mark-start-of-extraterrestrial-manufacturing/>.*

Cohen; Carbon Radiation Shielding for the Habot Mobile Lunar Base; Jul. 19-22, 2004; SAE International; 34th International Conference on Environmental Systems (ICES); SAE Technical Paper Series 2004-1-2323.*

Ignatiev; Advanced Thin-Film Materials Processing in the Ultra-Vacuum of Space; 2001; Elsevier Science Ltd.; Acta Astronautica vol. 48, No. 2-3, pp. 115-120.*

Sastri et al.; Manufacturing and Fabrication, part 3; Jan. 1, 1992; NASA; Space Resources, vol. 3 Materials; pp. 270-280.*

Criswell; Extraterrestrial Materials Processing and Construction; Sep. 30, 1978; NASA.*

Teegavarapu et al.; Design for Extraterrestrial Manufacturing; 2006; Clemson University.*

The Carbon Nanotubes; Feb. 21, 2007; IFW-Dresden; YouTube; <https://www.youtube.com/watch?v=tgToxaOqF10>.*

O'Neill; The Low (Profile) Road to Space Manufacturing; Mar. 1978; AIAA; Astronautics and Aeronautics, vol. 16, No. 3, pp. 24-32.*

O'Neill; Engineering a Space Manufacturing Center; Oct. 1976; AIAA; Astronautics and Aeronautics, vol. 14, No. 10, pp. 20-28, 36.*

How are carbon nanotubes made?; Vega Science and nano2hybrids; Nov. 11, 2008; YouTube; <https://www.youtube.com/watch?v=B4VTfgaKLAM>.*

Where are nanotubes used?; Vega Science and nano2hybrids; Feb. 3, 2009; YouTube; <https://www.youtube.com/watch?v=Z8h6yhvBZII>.*

* cited by examiner

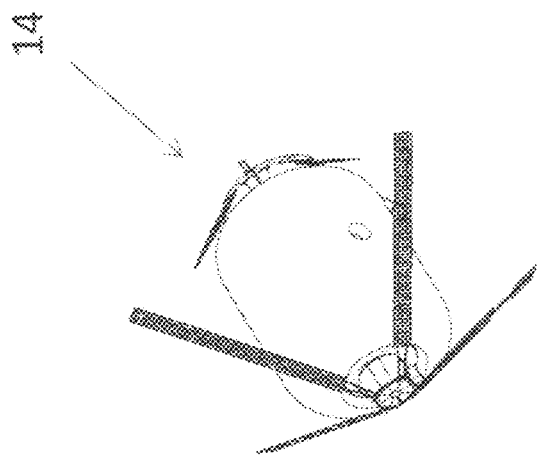
Fig. 2

METHOD OF DEPLOYING A SPACECRAFT SHIELD IN SPACE

FIELD OF THE INVENTION

This invention generally relates to shields for use with a deployed spacecraft. In particular, this application addresses the use of carbon nanotubes in a spacecraft shield configuration.

BACKGROUND OF THE INVENTION

Missions in space face the problem of spacecrafts being bombarded with space debris including meteoroids ranging in size from microscopic particles to visibly larger compositions. Compounding this problem is the case where the debris is traveling at high velocities.

Some high velocity debris can penetrate a traditional hard shelled spacecraft or cause a great deal of impact damage that weakens the shell of the craft making the shell more susceptible to subsequent failure. In the case of a penetration of the hull, this can lead to loss of a habitable pressurized environment that can endanger a crew. The debris could also impact sensitive equipment in a spacecraft, which could cause a variety of failures.

One solution to this problem has been the application of impact shields disposed about the outer surface of a spacecraft. There are a variety of techniques used including monolithic shielding. Monolithic shielding is typically a hard structure that is designed to prevent the debris from penetrating the shield. These types of shield cover a wide range of materials including metal coverings on the outside of a spacecraft.

Naturally, a solid metal shield—like steel—would be very heavy for a large spacecraft and that translates into a great deal of expense to place such a shield into orbit. This can be particularly true where the spacecraft has a complex geometry.

Carbon nanotubes have a higher strength than steel and yet are lighter. The carbon nanotubes are presently grown in a laboratory environment with the lengths of the tubes being relatively short. What is needed is a spacecraft shield that is comprised of carbon nanotubes of a longer length.

SUMMARY OF THE INVENTION

A method of producing a shield for use with a spacecraft to provide some protection to the spacecraft's hull against space debris is disclosed. A facility is placed in space to grow carbon nanotubes in a low gravity environment. The nanotubes are grown to form a segment of a spacecraft shield. The shield is then attached to the outer surface of a spacecraft's hull. Multiple shields are arranged to substantially enclosing the outer surface of the spacecraft's hull.

BRIEF DESCRIPTION OF THE DRAWINGS

The invention is generally shown by way of reference to the accompanying drawings in which:

FIG. 2 is a side view of a facility in orbit around the Earth.

DETAILED DESCRIPTION OF THE INVENTION

One aspect of the present invention is the use of carbon nanotubes (CNTs) as a bumper in a spacecraft shield for a Whipple type configuration. CNTs are cylindrical in shape and can have a length-to-diameter ration of up to approximately 132,000,000:1.

CNTs also have a strength between 10-60 GPa (gigapascals), which is much higher than steel. Even so, the specific density of CNTs is between 1.3-2 while steel is 7.8 making CTNs attractive for space deployment. CNTs can take numerous shapes such as single walled or multi-walled.

Figure 1:
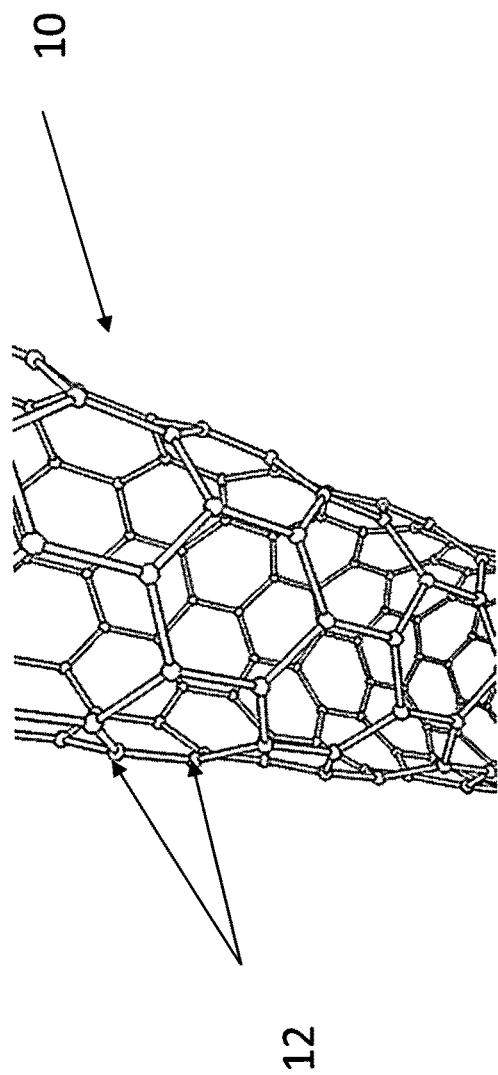
FIG. 1 is a side view of a portion of a carbon nanotube.

FIG. 1 identifies the general structure of a CNT 10, which is comprised of carbon atoms 12 bonded together. FIG. 2 identifies a space deployed facility 14 for producing carbon nanotubes. The facility 14 can be a spacecraft suitable for human habitation. In the embodiment identified, the facility 14 is an inflatable spacecraft for human use. In this figure, the spacecraft 14 is in orbit about the Earth.

The carbon nanotubes can be grown by techniques such as arc discharge, chemical vapor deposition, and laser ablation. The facility in space is situated in a low gravity environment. Low gravity also includes the case of zero gravity. The low gravity allows for growing longer CNTs. The CNTs can be combined with other compounds to form mixtures that can be tailored to specific operational and environmental requirements for shield segments. Such compounds can include plastics, polymers, other carbon based compounds such as Buckminsterfullerenes, or a combination of these materials or other appropriate materials. Growing techniques combined with bonding, the inclusion of other compounds, and the low gravity environment allows for the production of CNT shield segments of a wide variety of geometries.

In one embodiment this can be demonstrated by producing a surface that is more desirable for bonding two shield segments together with, for example, an adhesive. In other embodiments, the shield segments can include holes for receiving bolts in securing the shield segment to a spacecraft.

The facility can be a separate structure from a spacecraft to receive the shielding, or can be the spacecraft. By having the operation of producing the carbon nanotubes as part of the spacecraft, the logistics of transporting the completed shielding can be less complicated.

Figure 3:
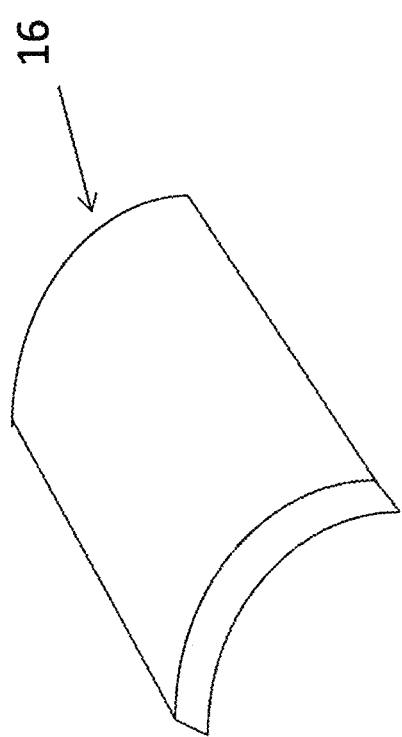
FIG. 3 is a perspective view of a CNT shield segment.
Figure 4:
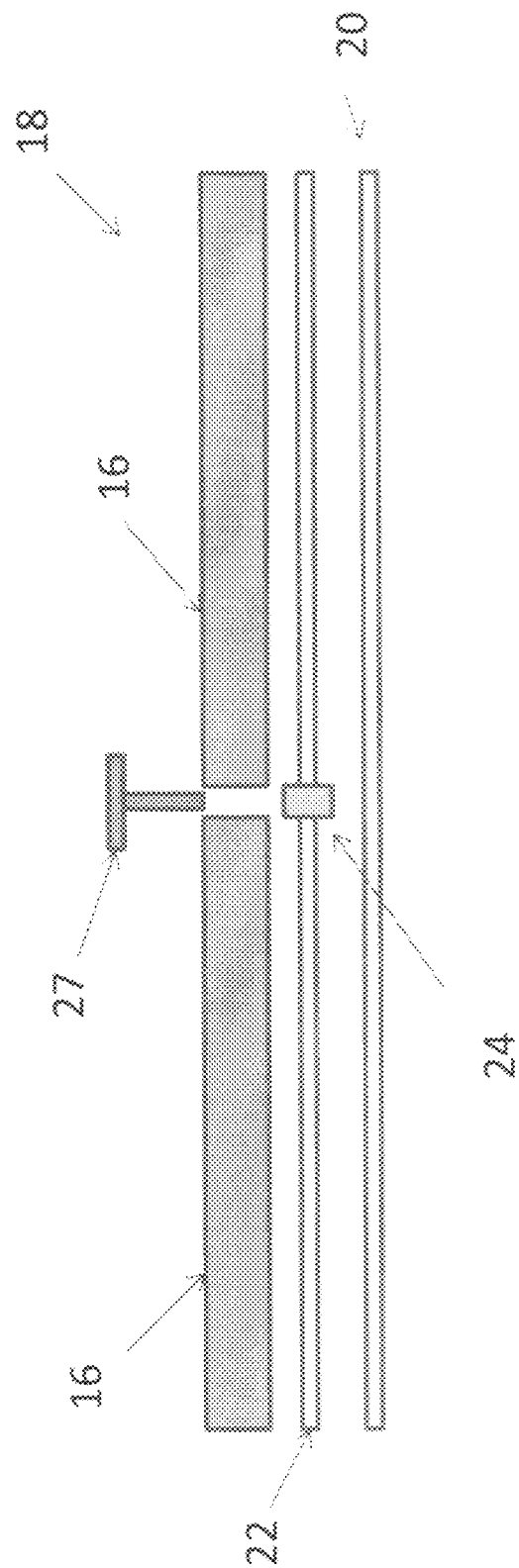
FIG. 4 is a cut away side view of an embodiment of CNT shields disposed over a spacecraft's hull.

FIG. 3 identifies a shield segment 16 comprised of CNTs. The CNTs can be formed in shield segment shapes such as embodied in FIG. 3. FIG. 4 identifies one embodiment of the shield segments attached to the hull of a spacecraft. The shield segment 16 is substantially the shape of a corresponding section of the hull 20 in that the shield segment 16 is set away from the hull 20 and therefore not necessarily the exact shape of the hull 20. The shield segment 16 is attached to the external spacecraft hull in space 18. The Hull 20 can be a solid hull or a flexible hull as found in an inflatable spacecraft. In the present embodiment, a skeletal structure 22 surrounds the hull 20. The skeletal structure 22 has a plurality of connection points 24 to receive connecting pins 26. The shield segments 16 are placed in contact with the skeletal structure 22. The connecting pins 26 are secured to the connecting points 24 thereby holding the segments 16 in place.

Figure 5:
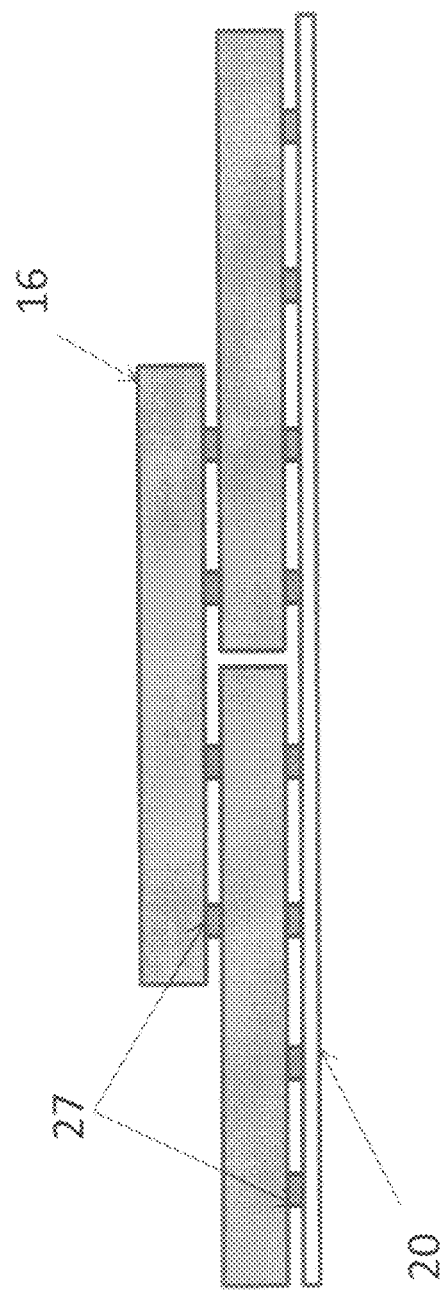
FIG. 5 is a cut away side view of another embodiment of CNT shields disposed over a spacecraft's hull.

FIG. 5 identifies another embodiment for securing the shield segments to the hull of a spacecraft. In this embodiment, the shield segments are secured one to another using adhesive. Adhesive 27 is used to secure the shield segments to the hull 20. In another embodiment, an intermediate layer could be placed on the hull to receive the adhesive. The adhesive holds the segments 16 in place and other segments 16 are mounted on top. This procedure could be repeated until a desired lever of layering is achieved.

Figure 6:
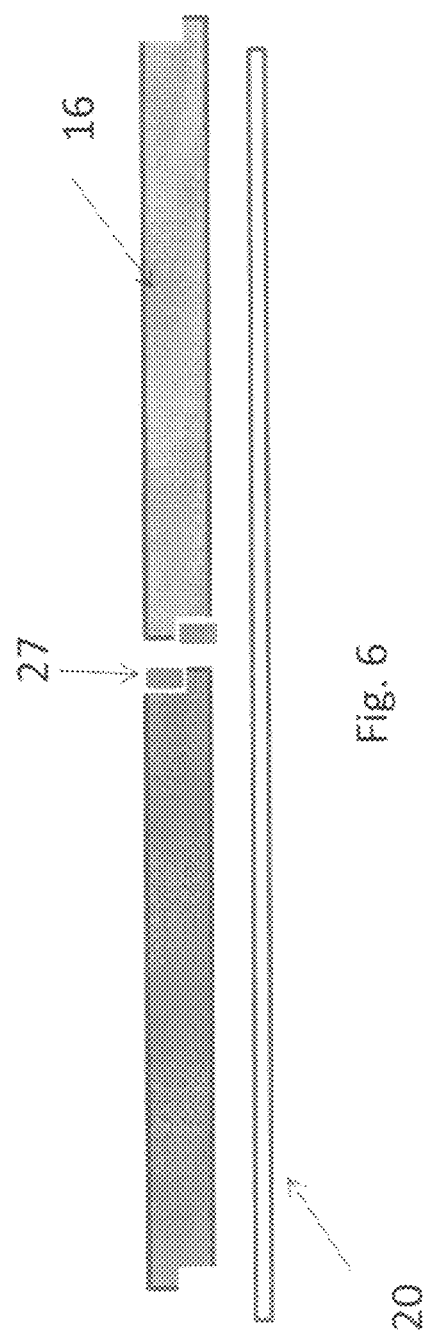
FIG. 6 is a cut away side view of an embodiment of CNT shields disposed over a spacecraft's hull.

FIG. 6 is another embodiment that uses adhesives to secure the shield segments together. In this embodiment the shield segments 16 are formed to partially overlap. Adhesives 27 secure the overlapping portions of the segments together. In this way, the segments 16 do not generally contact the hull 20. However, in other embodiments the segments 16 can be in contact with the hull while lacking an adhesive between the segment and the hull.

Figure 7:
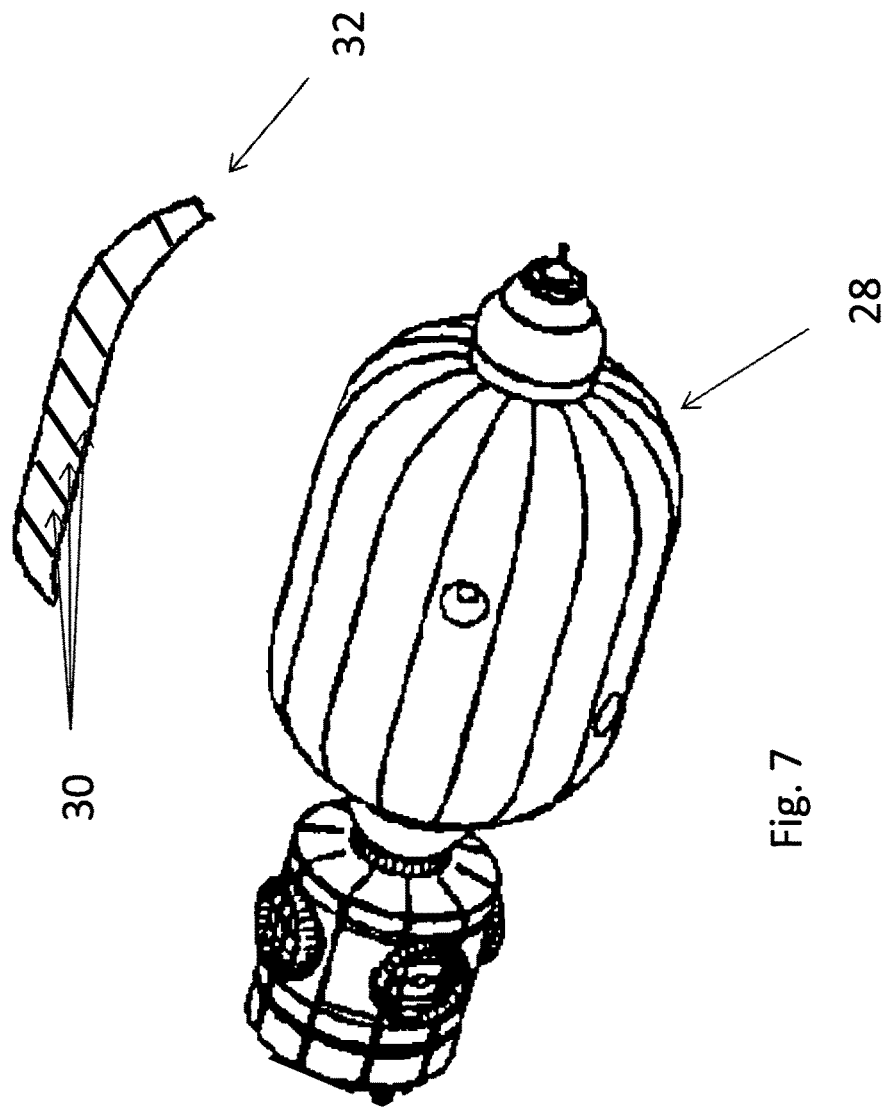
FIG. 7 is a perspective view of several CNT shield segments assembled.

In FIG. 7, an inhabitable inflatable spacecraft 28 is deployed in space. Inside the spacecraft 28, equipment produces CNT spacecraft shield segments. In this embodiment, shield segments 30 are transported outside the spacecraft 28 and assembled into larger segments 32 that can then be placed over an area of the spacecraft 28. This embodiment also illustrates the use of shield segments of different shapes to accommodate the outer hull geometry of a spacecraft. In other embodiments the shield segments can individually be placed over the outer hull of a spacecraft.

Figure 8:
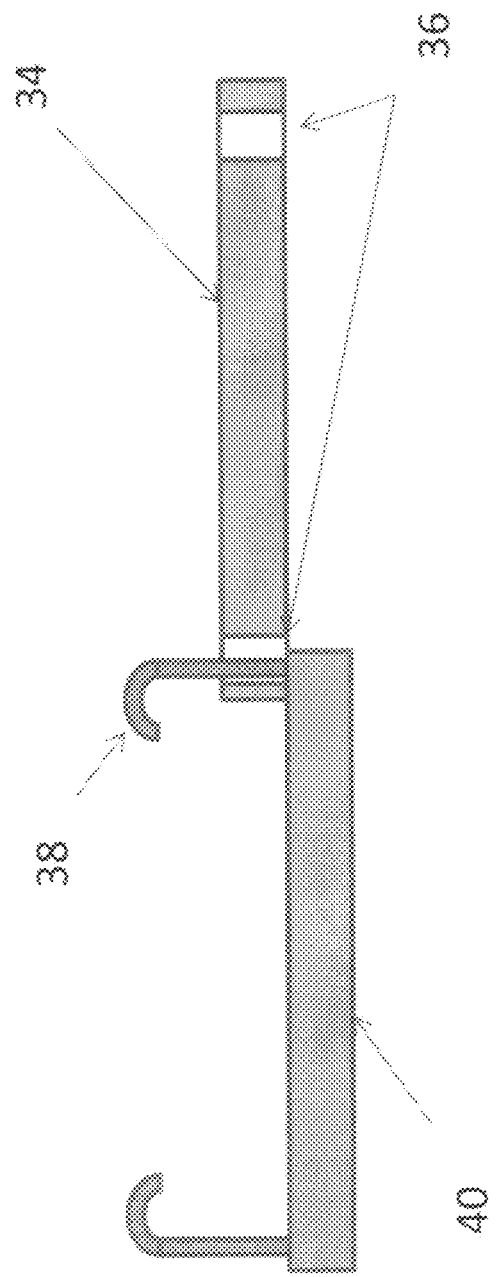
FIG. 8 is a cut away side view of another embodiment of CNT shields using a hook type connector.

FIG. 8 identifies a CNT spacecraft shield arrangement with a receiving CNT shield 34 having holes 36 to receive a hook type structure 38 that is part of a retaining CNT shield 40. A variety of geometries for the holes and hook type structures could be used and the invention does not limit such a variety.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A method of deploying a shield to provide protection to a hull of a spacecraft against space debris, comprising the steps of:
    a) providing at least one receiving type shield segment comprised of carbon nanotubes within a spacecraft,
        wherein each receiving type shield segment is in a shape to substantially conform to a segment of an outer surface of a hull of a spacecraft deployed in space,
        wherein each receiving type shield segment comprises at least two holes extending from an inner surface to an outer surface of the shield segment,
            wherein the at least two holes are disposed at opposite ends of each receiving type shield segment and are each adapted to receive a corresponding hook type structure;
    b) providing at least one retaining type shield segment comprised of carbon nanotubes within a spacecraft,
        wherein each retaining type shield segment is in a shape to substantially conform to a segment of an outer surface of a hull of a spacecraft deployed in space,
        wherein each retaining type shield segment comprises at least two hook type structures disposed at opposite ends of each segment,
            wherein each hook type structure is adapted to be received by a corresponding hole in a receiving type shield segment;
    c) transporting the receiving and retaining type shield segments from inside to outside the spacecraft in space;
    d) placing the receiving and retaining type shield segments in the vicinity of a corresponding area of an outer hull of a spacecraft deployed in space;
    e) connecting a hook type structure of a retaining type shield segment through a corresponding hole of a receiving type shield segment such that the retaining and receiving type shield segments are assembled in place with respect to one another; and
    f) repeating steps c) through e) until the assembled receiving and retaining shield segments substantially enclose the hull of the spacecraft.

* * * * *